US012709873B2

(12) United States Patent
Naito

(10) Patent No.: US 12,709,873 B2
(45) Date of Patent: Aug. 18, 2026

(54) DIAGNOSIS SUPPORT SYSTEM FOR WORK MACHINE, FAILURE DIAGNOSIS SYSTEM FOR WORK MACHINE, DIAGNOSIS SUPPORT METHOD FOR WORK MACHINE, AND FAILURE DIAGNOSIS METHOD FOR WORK MACHINE

(71) Applicant: KOMATSU LTD., Tokyo (JP)

(72) Inventor: Shinichi Naito, Tokyo (JP)

(73) Assignee: KOMATSU LTD., Tokyo (JP)

( * ) Notice: Subject to any disclaimer, the term of this patent is extended or adjusted under 35 U.S.C. 154(b) by 330 days.

(21) Appl. No.: 18/277,145

(22) PCT Filed: Jan. 7, 2022

(86) PCT No.: PCT/JP2022/000333
§ 371 (c)(1),
(2) Date: Aug. 14, 2023

(87) PCT Pub. No.: WO2022/181070
PCT Pub. Date: Sep. 1, 2022

(65) Prior Publication Data

US 2024/0125098 A1 Apr. 18, 2024

(30) Foreign Application Priority Data

Feb. 26, 2021 (JP) ................................ 2021-029536

(51) Int. Cl.
*E02F 9/26* (2006.01)
*G05B 23/02* (2006.01)

(52) U.S. Cl.
CPC .......... *E02F 9/267* (2013.01); *G05B 23/0216* (2013.01)

(58) Field of Classification Search
CPC . E02F 9/267; E02F 3/764; E02F 3/765; E02F 3/7654; E02F 9/2253; G05B 23/0216; G05B 23/0213
See application file for complete search history.

(56) References Cited

U.S. PATENT DOCUMENTS 8,656,216 B2 * 2/2014 Shigehara ........... G06F 11/2242 714/25
9,678,845 B2 * 6/2017 Suzuki ............... G05B 23/0208
2011/0276828 A1 11/2011 Tamaki et al.
2013/0073260 A1 3/2013 Maeda et al.
2014/0236418 A1 8/2014 Koga et al.
2020/0408591 A1 12/2020 Suzuki et al.
2022/0035356 A1 * 2/2022 Kudo ................ G05B 23/0254

FOREIGN PATENT DOCUMENTS

CN 109519368 A * 3/2019 ............. G06Q 10/20
CN 110135021 A 8/2019
CN 111694344 A 9/2020

(Continued)

*Primary Examiner* — Tung S Lau
(74) *Attorney, Agent, or Firm* — Faegre Drinker Biddle & Reath LLP

(57) ABSTRACT

A controller specifies a diagnosed portion to be diagnosed in a motor grader based on candidate information of an abnormality candidate in the motor grader, specifies a first sensor connection position of a diagnosis sensor for diagnosis of the diagnosed portion, and controls a display apparatus to display position information of the first sensor connection position.

9 Claims, 9 Drawing Sheets

(56) References Cited

FOREIGN PATENT DOCUMENTS

| | | | |
|---|---|---|---|
| CN | 111919103 | A | 11/2020 |
| CN | 112162209 | A | 1/2021 |
| JP | H01-229593 | A | 9/1989 |
| JP | 2006-350499 | A | 12/2006 |
| JP | 2011-38273 | A | 2/2011 |
| JP | 2011-227706 | A | 11/2011 |
| JP | 2015-045145 | A | 3/2015 |
| WO | WO-2010/082322 | A1 | 7/2010 |
| WO | WO-2013/047408 | A1 | 4/2013 |

* cited by examiner

10
CONTROLLER
P5
P6
P7
P1
P2
P3
P4
13a
42
41
FL
FH
FL
ONE STAGE
TWO STAGE
THREE STAGE
FOUR STAGE
41A
41B
41C
42A
42B
42C
42D
45A
45B
45C
45D
45E
45F
45G
45
56
52b
13b
55
P8
P9
54
53
52a
51

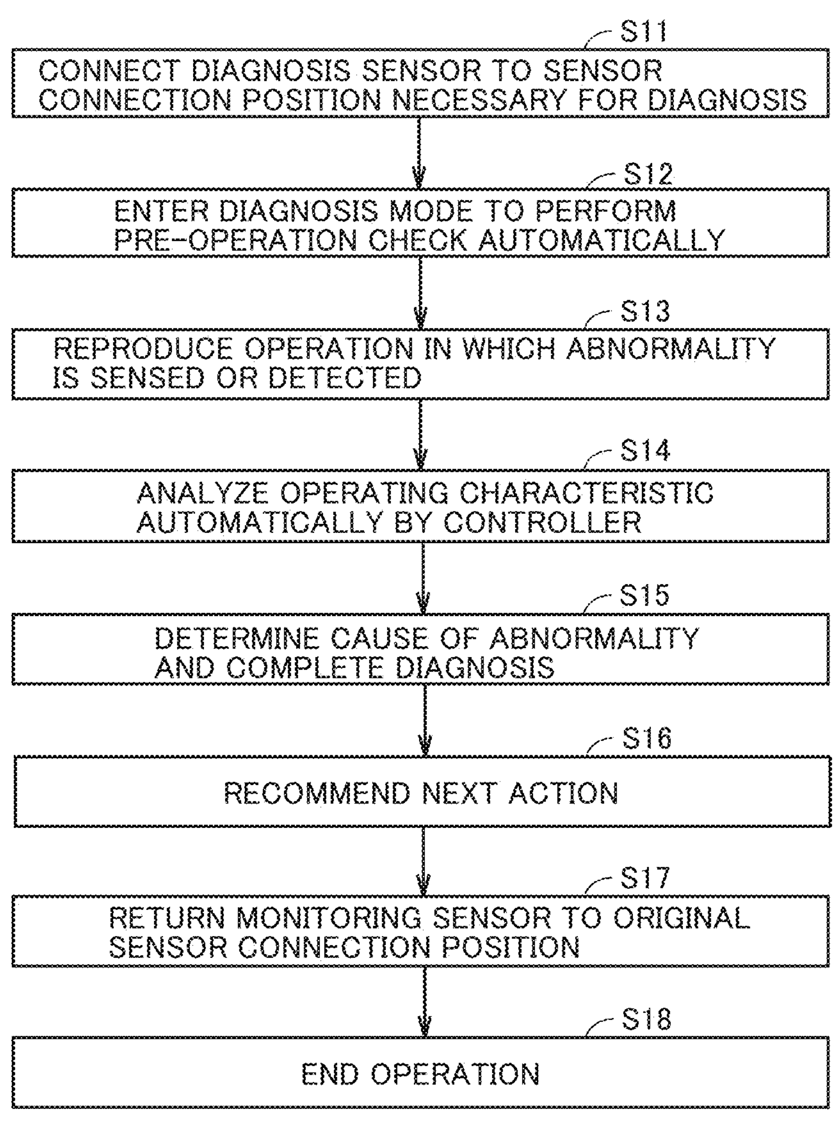
FIG.9
S11
CONNECT DIAGNOSIS SENSOR TO SENSOR CONNECTION POSITION NECESSARY FOR DIAGNOSIS
S12
ENTER DIAGNOSIS MODE TO PERFORM PRE-OPERATION CHECK AUTOMATICALLY
S13
REPRODUCE OPERATION IN WHICH ABNORMALITY IS SENSED OR DETECTED
S14
ANALYZE OPERATING CHARACTERISTIC AUTOMATICALLY BY CONTROLLER
S15
DETERMINE CAUSE OF ABNORMALITY AND COMPLETE DIAGNOSIS
S16
RECOMMEND NEXT ACTION
S17
RETURN MONITORING SENSOR TO ORIGINAL SENSOR CONNECTION POSITION
S18
END OPERATION

DIAGNOSIS SUPPORT SYSTEM FOR WORK MACHINE, FAILURE DIAGNOSIS SYSTEM FOR WORK MACHINE, DIAGNOSIS SUPPORT METHOD FOR WORK MACHINE, AND FAILURE DIAGNOSIS METHOD FOR WORK MACHINE

TECHNICAL FIELD

The present disclosure relates to a diagnosis support system for a work machine, a failure diagnosis system for a work machine, a diagnosis support method for a work machine, and a failure diagnosis method for a work machine.

BACKGROUND ART

A maintenance device for a work machine is disclosed in Japanese Patent Laying-Open No. 2006-350499 (PTL 1), for example. PTL 1 discloses storing of image data indicating arrangement of components of a work machine, and creating and displaying of an image specifying a component corresponding to maintenance information in the image data.

CITATION LIST

Patent Literature

PTL 1: Japanese Patent Laying-Open No. 2006-350499

SUMMARY OF INVENTION

Technical Problem

Conventionally, in a case where an abnormality is sensed and detected in an operating characteristic of a work machine, a service person needs to go to the site and measure the operating characteristic. However, in recent years, with development of a communication environment, transmission and reception of significantly large capacity data has become possible. As a result, information on various operating characteristics of a work machine can be obtained from a distant place.

However, for example, in the case of a transmission or the like, there is a large number of points at which measurement of a hydraulic pressure as an operating characteristic is desired. Therefore, installing a diagnosis sensor for failure identification at every point where the hydraulic pressure is desired to be measured leads to an increase in the number of components. In particular, in the case of a small and medium mass production model, it is difficult to install a large number of diagnosis sensors and provide each of these sensors with a communication function, in terms of cost.

An object of the present disclosure is to provide a diagnosis support system for a work machine, a failure diagnosis system for the work machine, a diagnosis support method for the work machine, and a failure diagnosis method for the work machine, with all of which a failure can be easily and accurately identified with a small number of components.

Solution to Problem

A diagnosis support system for a work machine of the present disclosure includes a display apparatus and a controller. The controller specifies a diagnosed portion in the work machine based on candidate information of an abnormality candidate in the work machine, specifies a first sensor connection position of a diagnosis sensor for diagnosis of the diagnosed portion, and controls the display apparatus to display position information of the first sensor connection position.

A failure diagnosis system for a work machine of the present disclosure includes the above-described diagnosis support system for a work machine and the above-described diagnosis sensor connected to the first sensor connection position. The controller analyzes an operating characteristic of the work machine based on a detection signal from the diagnosis sensor.

A diagnosis support method for a work machine of the present disclosure is a diagnosis support method for a work machine having a display apparatus, and includes the following steps.

A diagnosed portion in the work machine based is specified based on candidate information of an abnormality candidate in the work machine. A first sensor connection position of a diagnosis sensor for diagnosis of the diagnosed portion is specified. The display apparatus is controlled to display position information of the first sensor connection position.

A failure diagnosis method for a work machine of the present disclosure includes analyzing, after the above-described diagnosis support method for a work machine, an operating characteristic of the work machine based on a detection signal from the diagnosis sensor connected to the first sensor connection position.

Advantageous Effects of Invention

According to the present disclosure, it is possible to realize a diagnosis support system for a work machine, a failure diagnosis system for the work machine, a diagnosis support method for the work machine, and a failure diagnosis method for the work machine, with all of which a failure can be easily and accurately identified with a small number of components.

BRIEF DESCRIPTION OF DRAWINGS

FIG. 9 is a flowchart showing a processing step of failure diagnosis after connecting the diagnosis sensor.

DESCRIPTION OF EMBODIMENT

Figure 1:
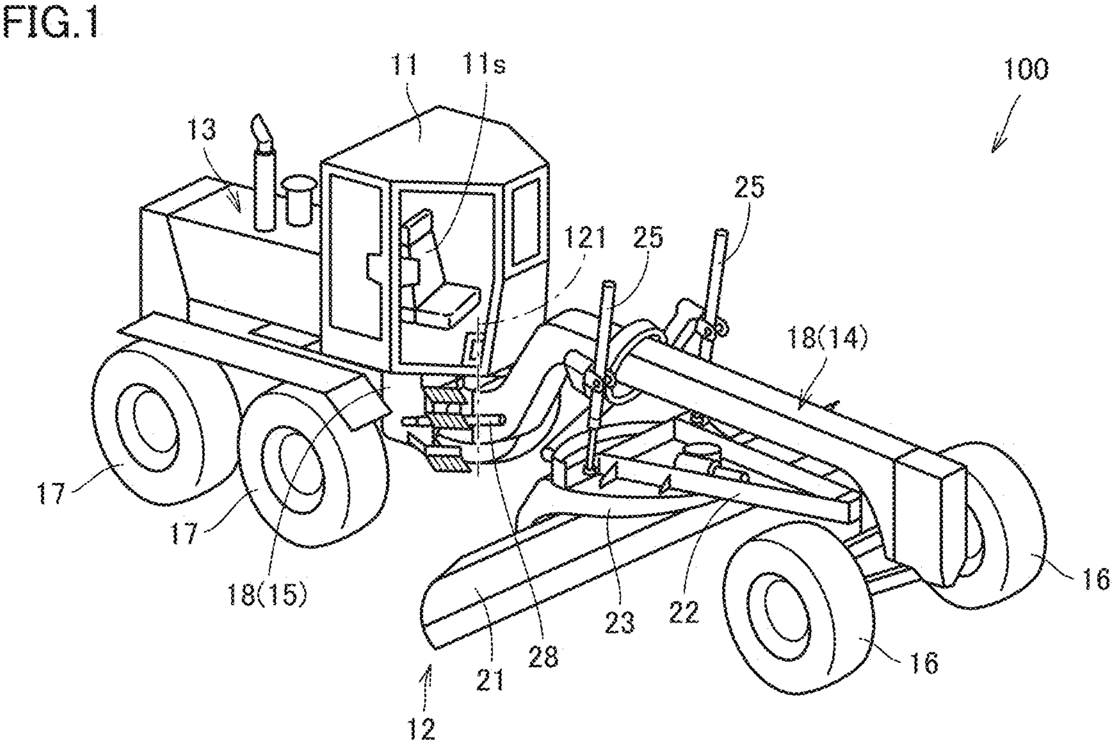
FIG. 1 is a perspective view schematically illustrating a configuration of a work machine according to an embodiment of the present disclosure.

Hereinafter, an embodiment of the present disclosure will be described with reference to the drawings.

In the description and the drawings, the same components or corresponding components are denoted by the same reference numerals, and redundant description will not be repeated. In the drawings, a configuration may be omitted or simplified for convenience of description.

The present disclosure is applicable to a work machine such as a hydraulic excavator, a wheel loader, a crawler dozer, and a forklift, in addition to a motor grader. In the following description, "upper", "lower", "front", "rear", "left", and "right" are directions based on a user seated on an operator's seat 11S in an operator's cab 11 in FIG. 1.

<Configuration of Work Machine>

First, a configuration of a motor grader as an example of the work machine of the present embodiment will be described with reference to FIGS. 1 and 2.

Figure 2:
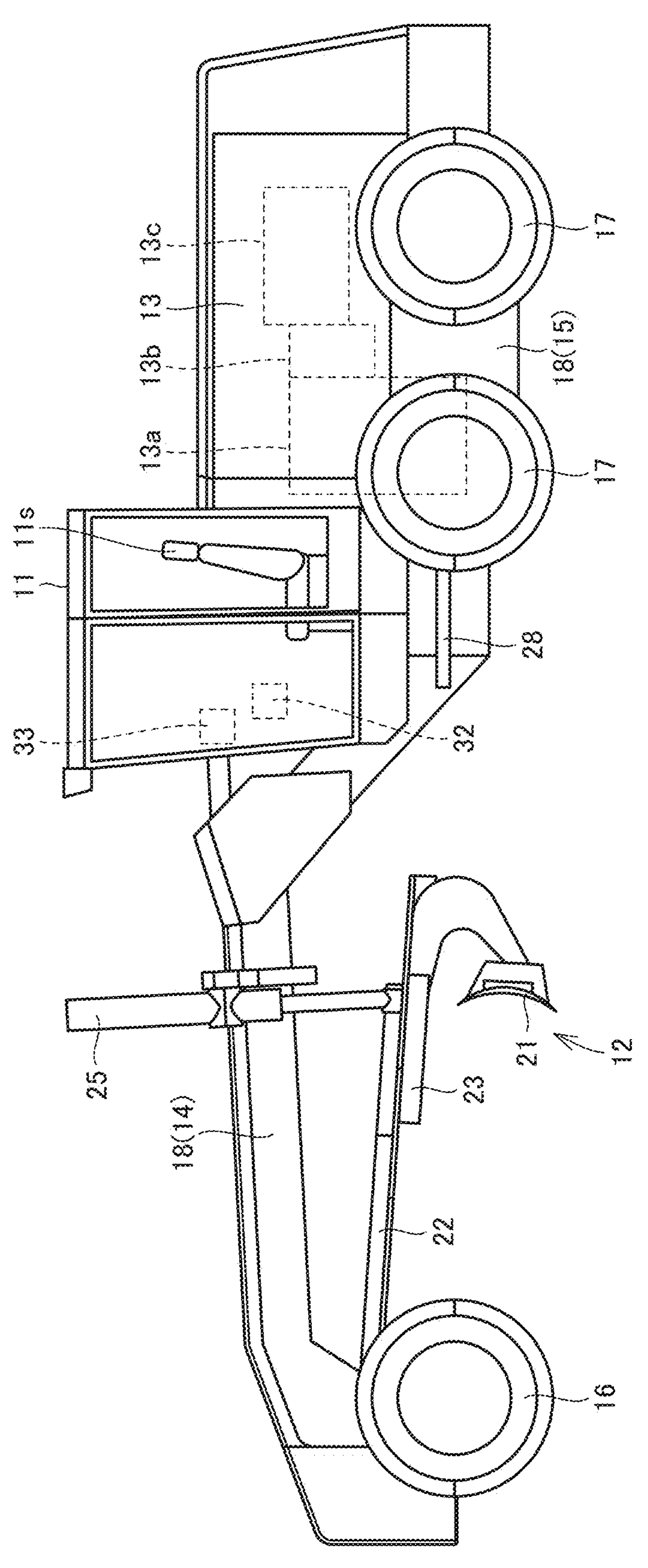
FIG. 2 is a side view illustrating the configuration of the work machine illustrated in FIG. 1.

FIGS. 1 and 2 are respectively a perspective view and a side view schematically illustrating a configuration of the work machine according to the embodiment of the present disclosure. As illustrated in FIG. 1, a motor grader 100 is the work machine that performs land grading and snow removal while traveling.

Motor grader 100 includes a front frame 14, a rear frame 15, a pair of articulated cylinders 28, operator's cab (cab) 11, an engine cover 13, front wheels 16 and rear wheels 17, and a work implement 12.

Front frame 14 and rear frame 15 constitute a vehicle body frame 18 of motor grader 100. Front frame 14 is disposed in front of rear frame 15.

Front frame 14 is rotatably connected to rear frame 15 by a center pin (not illustrated) provided on an axis line 121 of a rotation center. Axis line 121 of the rotation center is an axis extending along a vertical direction.

The pair of articulated cylinders 28 are respectively provided on both left and right sides across front frame 14. Articulated cylinders 28 are hydraulic cylinders driven by hydraulic pressure so as to expand and contract. Front frame 14 rotates about axis line 121 of the rotation center with respect to rear frame 15 by expansion and contraction driving of articulated cylinders 28.

Front wheels 16 and rear wheels 17 are running wheels. Front wheels 16 are rotatably attached to front frame 14. Front wheels 16 are steering wheels, and are attached to front frame 14 in a steerable manner. Rear wheels 17 are rotatably attached to rear frame 15. To rear wheels 17, a driving force from the engine is transmitted.

Work implement 12 is disposed between front wheels 16 and rear wheels 17 in a fore/aft direction. Work implement 12 is supported by front frame 14. Work implement 12 includes a blade 21, a drawbar 22, a swing circle 23, and a pair of lift cylinders 25.

Drawbar 22 is provided below front frame 14. A front end of drawbar 22 is swingably connected to a distal end of front frame 14. The pair of lift cylinders 25 are respectively provided on both left and right sides of front frame 14. A rear end of drawbar 22 is supported by front frame 14 via the pair of lift cylinders 25.

The rear end of drawbar 22 can be moved up and down with respect to front frame 14 by extension and contraction of the pair of lift cylinders 25. When the pair of lift cylinders 25 are both driven to contract, a height of blade 21 with respect to front frame 14 and front wheels 16 is adjusted upward. When the pair of lift cylinders 25 are both driven to extend, the height of blade 21 with respect to front frame 14 and front wheels 16 is adjusted downward.

Drawbar 22 is swingable up and down about an axis along the fore/aft direction by the pair of lift cylinders 25 expanding and contracting differently from each other.

Swing circle 23 is disposed below drawbar 22. Swing circle 23 is pivotably connected to drawbar 22. Swing circle 23 is pivotable in a clockwise and counterclockwise direction about an axis along the vertical direction.

Blade 21 is disposed below swing circle 23. Blade 21 is provided to face the ground. Blade 21 is supported by swing circle 23. Blade 21 pivots such that an angle (blade angle) formed by blade 21 with respect to the fore/aft direction in top view changes along with a pivoting motion of swing circle 23. A pivoting axis of blade 21 is an axis extending along the vertical direction.

As illustrated in FIG. 2, operator's cab 11 is placed on, for example, rear frame 15. Operator's cab 11 defines an indoor space for the user to board. In operator's cab 11, an input device 32, a display apparatus 33, a plurality of control levers, and the like are disposed in addition to operator's seat 11S. Operator's cab 11 may be placed on front frame 14.

Input device 32 is configured to enable various input operations by the user in failure diagnosis, for example. Input device 32 may be, for example, a switch, a button, a dial, a lever, a joystick, or the like, or may be a device with which time can be input.

Display apparatus 33 includes a display unit, and displays, for example, a work procedure of failure diagnosis on the display unit. The display unit may be, for example, a touch panel. In this case, when the user performs a touch operation on the touch panel, various input operations in the failure diagnosis may be possible without depending on the operation of input device 32. In this case, display apparatus 33 can function as input device 32.

Engine cover 13 covers an engine room and is supported by rear frame 15. In the engine room, a transmission 13*a*, a torque converter 13*b*, an engine 13*c*, an exhaust gas processing structure (not illustrated), and the like are disposed. Transmission 13*a* and torque converter 13*b* constitute a power transmission device, and transmit power from engine 13*c* to rear wheels 17.

Transmission 13*a* includes a hydraulic clutch and a speed change gear therein. Transmission 13*a* converts a rotational speed and torque of an input shaft connected to an output side of torque converter 13*b*. The converted rotational speed and torque are finally transmitted to rear wheels 17 from the output shaft of transmission 13*a* via a final reduction gear and a tandem device.

<Example of Sensor Connection Position of Diagnosis Sensor in Failure Diagnosis>

Next, an example of a sensor connection position of the diagnosis sensor in the failure diagnosis of motor grader 100 in FIGS. 1 and 2 will be described with reference to FIGS. 3 and 4.

Figure 3:
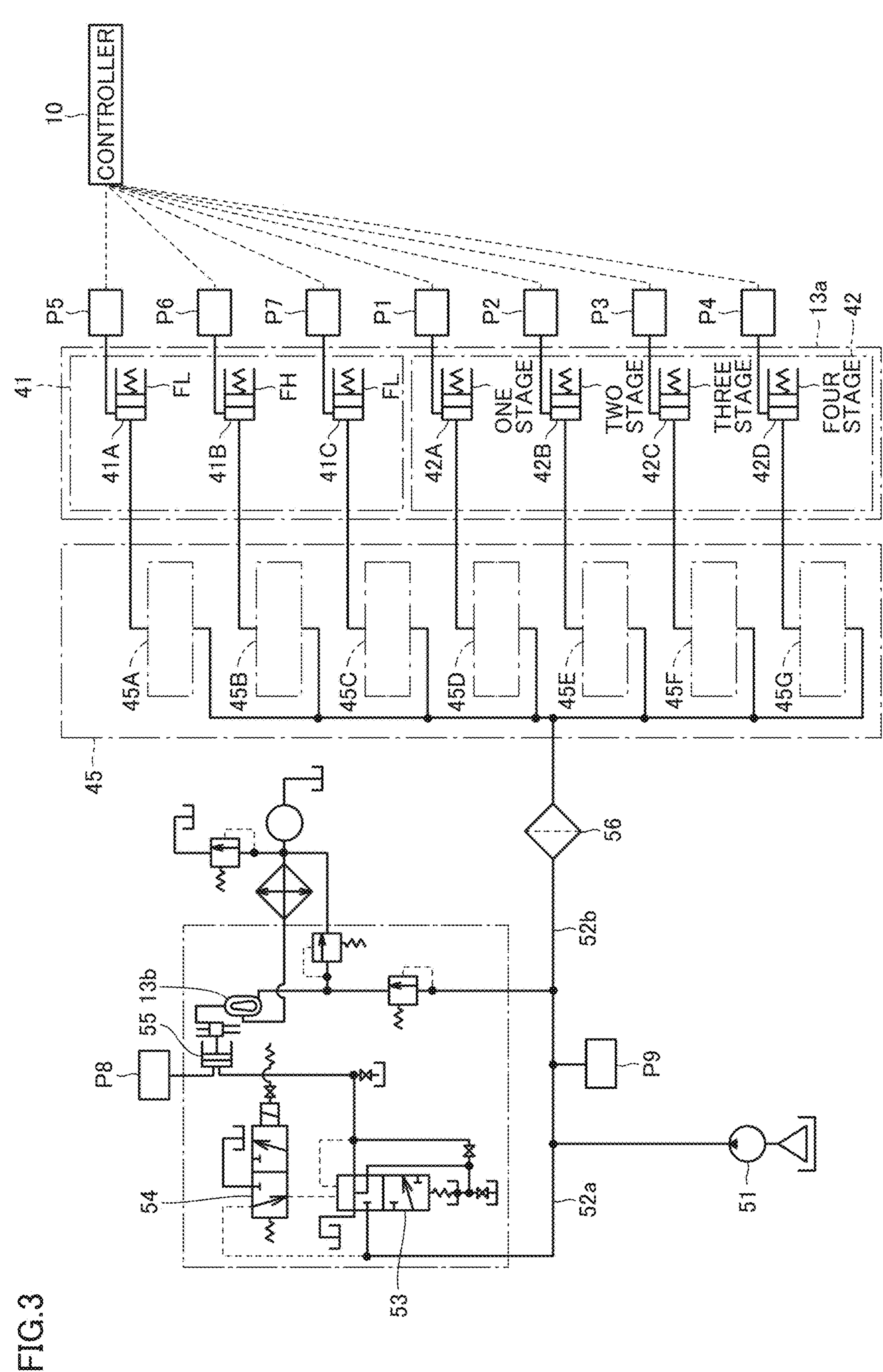
FIG. 3 is a diagram illustrating an example of a sensor connection position of a diagnosis sensor in failure diagnosis of the present disclosure, in which diagram a hydraulic circuit of a power transmission device in FIG. 2 is shown.

FIG. 3 is a diagram illustrating an example of a sensor connection position of the diagnosis sensor in the failure diagnosis of the present disclosure, in which diagram a hydraulic circuit of the power transmission device in FIG. 2 is shown. FIG. 4 is a plan view illustrating a sensor connection position of the diagnosis sensor in the failure diagnosis of the present disclosure, in which plan view a configuration of the transmission and the torque converter is shown.

As illustrated in FIG. 3, the hydraulic circuit of the power transmission device includes transmission 13*a*, torque converter 13*b*, and a connection force control mechanism 45.

A conduit connected to a hydraulic pump 51 includes one conduit 52*a* and another conduit 52*b* that are branched from each other. A hydraulic device for a lock-up mechanism of torque converter 13*b* is connected to one conduit 52*a*.

The hydraulic device for a lock-up mechanism includes a lock-up valve 53, a lock-up solenoid valve 54, and a lock-up clutch mechanism 55. Lock-up solenoid valve 54 supplies a pilot pressure to lock-up valve 53. Lock-up clutch mechanism 55 is connected between lock-up valve 53 and torque converter 13*b*.

Transmission 13*a* is connected to another conduit 52*b* via an oil filter 56 and connection force control mechanism 45. Transmission 13*a* includes a direction switching clutch mechanism 41 and a speed switching clutch mechanism 42.

Direction switching clutch mechanism 41 includes, for example, a forward low-speed (FL) clutch mechanism 41A, a forward high-speed (FH) clutch mechanism 41B, and a reverse (R) clutch mechanism 41C. Thus, direction switching clutch mechanism 41 can switch the direction in three stages.

Speed switching clutch mechanism 42 includes speed switching clutch mechanisms 42A, 42B, 42C, and 42D respectively of first to fourth gears. Thus, speed switching clutch mechanism 42 can switch the speed in four stages.

By coupling any one of direction switching clutch mechanisms 41A to 41C and any one of speed switching clutch mechanisms 42A to 42D, for example, speed positions of forward 8 stages and backward 4 stages can be obtained.

Connection force control mechanism 45 includes a plurality of electronic control regulating valves 45A to 45G. The plurality of electronic control regulating valves 45A to 45G are respectively connected to the plurality of clutch mechanisms 41A to 41C and 42A to 42D of transmission 13*a*.

At the time of failure identification, it is preferable to measure a hydraulic pressure at each of sensor connection positions P1 to P9 by connecting a hydraulic sensor as a diagnosis sensor to each of sensor connection positions P1 to P9. Specifically, the hydraulic pressure of each of speed switching clutch mechanisms 42A to 42D is preferably measured by the hydraulic sensor connected to each of sensor connection positions P1 to P4. Further, the hydraulic pressure of each of direction switching clutch mechanisms 41A to 41C is preferably measured by the hydraulic sensor connected to each of sensor connection positions P5 to P7. Moreover, the hydraulic pressure of lock-up clutch mechanism 55 is preferably measured by the hydraulic sensor connected to sensor connection positions P8. In addition, the hydraulic pressure of another conduit 52*b* is preferably measured by the hydraulic sensor connected to sensor connection positions P9.

A hydraulic pressure measured by the hydraulic sensor connected to each of sensor connection positions P1 to P9 is input to a controller 10 as an electric signal. Note that, at sensor connection positions P8 and P9, lines connected to controller 10 are omitted for simplification of the drawing.

Figure 4:
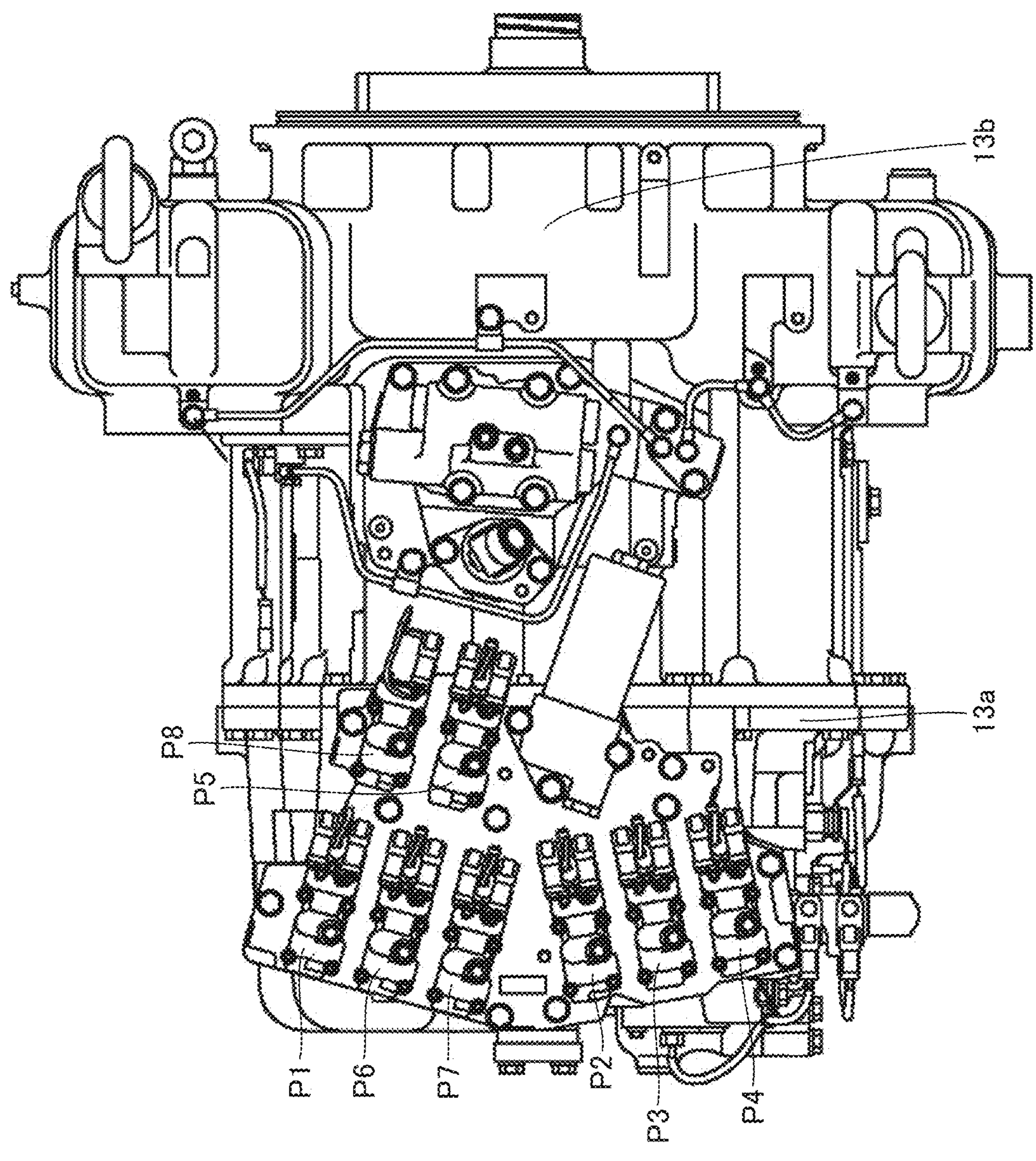
FIG. 4 is a plan view illustrating a sensor connection position of a diagnosis sensor in the failure diagnosis of the present disclosure, in which plan view a configuration of a transmission and a torque converter is shown.

As shown in FIG. 4, sensor connection positions P1 to P8 are arranged, for example, on an upper surface of each of transmission 13*a* and torque converter 13*b*. This facilitates connecting and disconnecting work of the hydraulic sensors to and from sensor connection positions P1 to P8.

<Configuration of Failure Diagnosis System>

Next, a configuration of a failure diagnosis system according to the present embodiment will be described with reference to FIG. 5.

Figure 5:
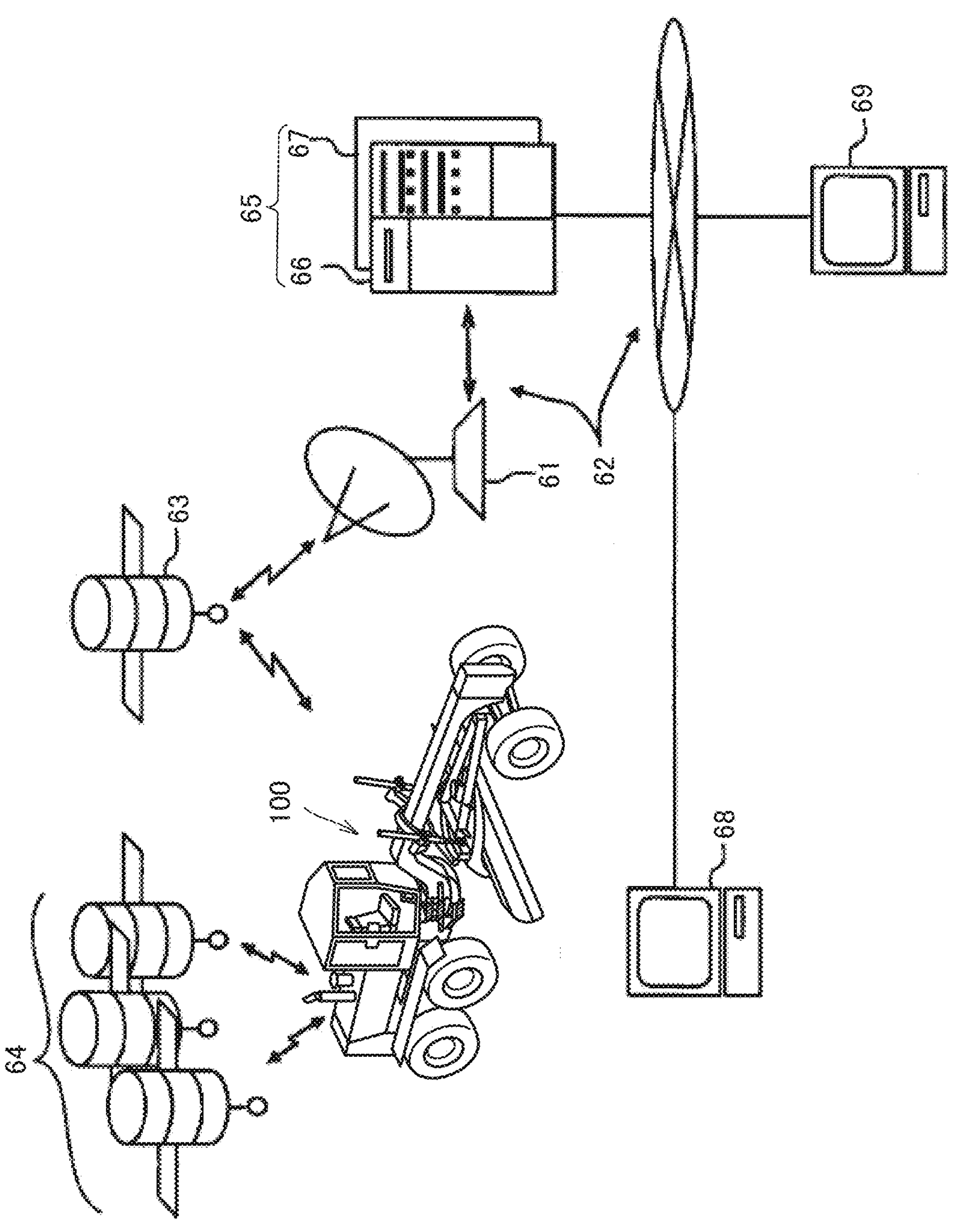
FIG. 5 is a diagram illustrating an example of a configuration of a failure diagnosis system for the work machine in FIG. 1.

FIG. 5 is a diagram illustrating a configuration of the failure diagnosis system for a work machine in FIG. 1. As illustrated in FIG. 5, the failure diagnosis system includes a work machine (for example, a motor grader) 100, a management server 65, a user terminal 68, a service terminal 69, and a communication network 62.

Management server 65 manages information of work machine 100. User terminal 68 is a terminal used by a user of work machine 100. Service terminal 69 is a terminal used by a service person who performs maintenance and inspection of work machine 100. Communication network 62 communicably connects work machine 100, management server 65, user terminal 68, and service terminal 69.

Communication network 62 includes a satellite wireless communication network, a dedicated ground communication network, and a computer communication network. The satellite wireless communication network connects work machine 100 and a satellite earth station 61 via a communication satellite 63. The dedicated ground communication network connects satellite earth station 61 and management server 65. The computer communication network is an intranet, the Internet, or the like that connects management server 65 and user terminal 68 or service terminal 69. Note that a reference numeral 64 denotes a plurality of global positioning system (GPS) satellites.

The satellite wireless communication network is used in order to enable communication between work machine 100 and management server 65 regardless of a location of work machine 100. If the same objective can be achieved, another type of mobile communication network, wireless communication network, or the like may be used instead of the satellite wireless communication network.

As user terminal 68 and service terminal 69, a personal computer, a workstation, a personal digital assistant (including a mobile phone, a tablet terminal, and the like), or the like is used, for example. Each of terminals 68 and 69 can execute an application program for bidirectional communication with management server 65.

Work machine 100 can perform bidirectional communication with management server 65 via the satellite wireless communication network. Work machine 100 has a function of continuously internally detecting and collecting operation information indicating a current operation state and transmitting the collected operation information to management server 65 in substantially real time. The operation information of work machine 100 includes, for example, an integrated operating time (service meter value), an engine speed, a battery voltage, a fuel amount, an engine cooling water temperature, and the like.

Management server 65 includes, for example, a communication server 66 and a maintenance server 67. Communication server 66 controls communication among work machine 100, user terminal 68, and service terminal 69. Maintenance server 67 creates and manages abnormality management information for work machine 100.

Abnormality information detected inside work machine 100 may be displayed on each of user terminal 68 and service terminal 69 using communication network 62. In addition, a command related to failure diagnosis in work machine 100 may be issued from each of user terminal 68 and service terminal 69.

Display apparatus 33 illustrated in FIGS. 1 and 2 may be a display unit of user terminal 68 or service terminal 69.

Controller 10 illustrated in FIG. 3 may be any one of maintenance server 67, user terminal 68, and service terminal 69. Controller 10 illustrated in FIG. 3 may be mounted on work machine 100.

<Configurations of Functional Blocks of Diagnosis Support System and Failure Diagnosis System>

Next, configurations of functional blocks of a diagnosis support system and the failure diagnosis system according to the present embodiment will be described with reference to FIG. 6.

Figure 6:
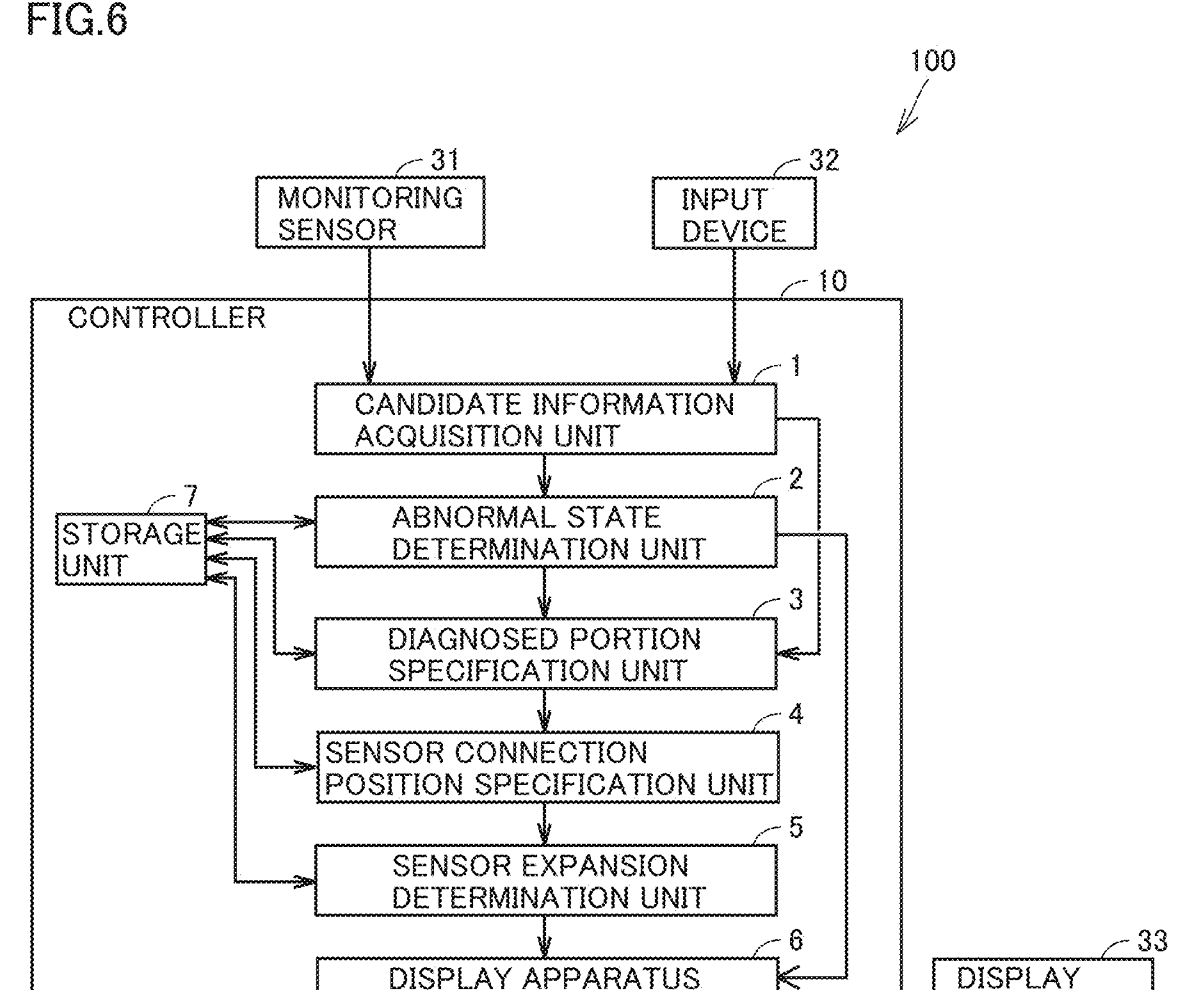
FIG. 6 is a diagram illustrating an example of functional blocks in the diagnosis support system and a failure diagnosis system for the work machine in FIG. 1.

FIG. 6 is a diagram illustrating an example of the functional blocks of the diagnosis support system and the failure diagnosis system for the work machine in FIG. 1. As illustrated in FIG. 6, the diagnosis supporting system for motor grader 100 includes controller 10, a monitoring sensor 31, input device 32, and display apparatus 33.

Monitoring sensor 31 detects an operating characteristic of motor grader 100. Monitoring sensor 31 is a sensor that constantly monitors an operating characteristic, and, for example, may be the hydraulic sensor connected to any one of sensor connection positions P1 to P9 illustrated in FIG. 3. Monitoring sensor 31 is not limited to the hydraulic sensor, and may be a rotation sensor, a temperature sensor, or the like, and may be any type of sensor.

Timing information regarding timing at which the user has sensed an abnormality in the operation of work machine 100, or portion information regarding a portion at which the user has sensed the abnormality is input to input device 32. Specifically, when the user performs an input operation on input device 32 at timing at which an abnormality is sensed (timing at which discomfort is sensed in the operation), the timing of the input operation is input to input device 32 as timing information of abnormality occurrence timing. In addition, by inputting time when the user has sensed the abnormality in the operation of work machine 100 to input device 32, the input time may be input to input device 32 as the timing information of the abnormality occurrence timing.

Controller 10 includes a candidate information acquisition unit 1, an abnormal state determination unit 2, a diagnosed portion specification unit 3, a sensor connection position specification unit 4, a sensor expansion determination unit 5, a display apparatus control unit 6, and a storage unit 7.

Storage unit 7 stores a normal operating characteristic value of each unit in the operating characteristic of work machine 100. Further, storage unit 7 stores a table indicating a correspondence relationship between a sensor detection position and a diagnosed portion (hereinafter, referred to as a "first table"), a table indicating a correspondence relationship between a portion where an abnormality is detected and a diagnosed portion (hereinafter, referred to as a "second table"), a table indicating a correspondence relationship between a diagnosed portion and a sensor connection position (hereinafter, referred to as a "third table"), and the like.

Storage unit 7 also stores connection position information indicating a position to which an existing monitoring sensor is connected and a position to which an existing monitoring sensor is not connected among the plurality of sensor connection positions (hereinafter referred to as "connection position information"). Storage unit 7 also stores information on a type of sensor that can be connected to each of the plurality of sensor connection positions (hereinafter, referred to as "sensor type information").

Further, storage unit 7 may store an operating characteristic value of each unit of work machine 100 at timing when the user performs an input operation to input device 32 at timing when an abnormality is sensed while operating work machine 100. In addition, storage unit 7 may continuously store the operating characteristic value of each unit in work machine 100.

Candidate information acquisition unit 1 acquires a detection signal of monitoring sensor 31 or an input signal of input device 32. Candidate information acquisition unit 1 outputs the acquired detection signal of monitoring sensor 31 to abnormal state determination unit 2 as candidate information of an abnormality candidate. Further, candidate information acquisition unit 1 outputs the acquired input signal of input device 32 to diagnosed portion specification unit 3 as candidate information of an abnormality candidate.

Abnormal state determination unit 2 determines whether or not an operating characteristic detected by monitoring sensor 31 is in an abnormal state, based on the acquired candidate information (detection signal of monitoring sensor 31). The determination as to whether or not the candidate information is in the abnormal state is made by comparing a characteristic value of the candidate information with the normal operating characteristic value stored in storage unit 7. For example, when the operating characteristic value detected by monitoring sensor 31 is within a range of the normal operating characteristic value stored in storage unit 7, abnormal state determination unit 2 determines that the operating characteristic is in the normal state. On the other hand, when the operating characteristic value detected by monitoring sensor 31 is out of the range of the normal operating characteristic value stored in storage unit 7, abnormal state determination unit 2 determines that the operating characteristic is in the abnormal state. Abnormal state determination unit 2 outputs a signal indicating the determination result to diagnosed portion specification unit 3.

When it has been determined that the operating characteristic is in the abnormal state, abnormal state determination unit 2 outputs a signal indicating the determination result to display apparatus control unit 6. Display apparatus control unit 6 controls display apparatus 33 to display that an abnormality has occurred on the basis of the acquired signal of the determination result. As a result, display apparatus 33 displays that an abnormality has occurred.

Diagnosed portion specification unit 3 specifies a portion where failure diagnosis is necessary based on the signal of the determination result acquired from abnormal state determination unit 2 or the candidate information acquired from candidate information acquisition unit 1 (input signal of input device 32). That is, diagnosed portion specification unit 3 specifies a portion where the failure diagnosis is necessary based on the candidate information of the abnormality candidate. Diagnosed portion specification unit 3 outputs a signal indicating the specified diagnosed portion to sensor connection position specification unit 4.

Sensor connection position specification unit 4 specifies a sensor connection position for connecting the diagnosis sensor (first sensor connection position) based on the acquired signal of the diagnosed portion. Sensor connection position specification unit 4 refers to the third table stored in storage unit 7 and specifies the first sensor connection position based on the acquired signal of the diagnosed portion. Sensor connection position specification unit 4 outputs a signal indicating the specified first sensor connection position to sensor expansion determination unit 5.

Sensor expansion determination unit 5 determines whether or not the sensor is expanded based on the acquired signal indicating the first sensor connection position.

Specifically, sensor expansion determination unit 5 determines whether or not an existing monitoring sensor is connected to the first sensor connection position. Sensor expansion determination unit 5 refers to the connection position information stored in storage unit 7, and determines whether or not the monitoring sensor is connected to the first sensor connection position based on the acquired first sensor connection position. That is, sensor expansion determination unit 5 determines whether or not the first sensor connection position to which the diagnosis sensor is to be connected is different from the sensor connection position to which monitoring sensor 31 is connected (second sensor connection position).

When it is determined that an existing monitoring sensor is connected at the first sensor connection position (when it is determined that the first sensor connection position is the same as the second sensor connection position), sensor expansion determination unit 5 instructs display apparatus control unit 6 to display a message to start failure diagnosis of the sensor connection position.

On the other hand, when it is determined that no existing monitoring sensor is connected at the first sensor connection position (when it is determined that the first sensor connection position is different from the second sensor connection position), sensor expansion determination unit 5 refers to the sensor type information stored in storage unit 7, and determines whether or not existing monitoring sensor 31 can be reconnected from the second sensor connection position to the first sensor connection position based on the acquired first sensor connection position.

When it is determined that the existing monitoring sensor cannot be reconnected from the second sensor connection position to the first sensor connection position, sensor expansion determination unit 5 instructs display apparatus control unit 6 to display the position information of the first sensor connection position to which the diagnosis sensor is to be additionally connected. In this case, sensor expansion determination unit 5 instructs display apparatus control unit 6 to display a display for prompting additional connection of a new diagnosis sensor to the first sensor connection position. Further, display apparatus control unit 6 is instructed to display a work procedure for additionally connecting a new diagnosis sensor to the first sensor connection position.

On the other hand, when it is determined that the existing monitoring sensor can be reconnected from the second sensor connection position to the first sensor connection position, sensor expansion determination unit 5 instructs display apparatus control unit 6 to display the position information of the first sensor connection position to which monitoring sensor 31 is to be reconnected. In this case, sensor expansion determination unit 5 instructs display apparatus control unit 6 to display a display for prompting reconnection of monitoring sensor 31 to the first sensor connection position. Further, display apparatus control unit 6 is instructed to display a work procedure for reconnecting the monitoring sensor to the first sensor connection position.

Display apparatus control unit 6 controls display apparatus 33 based on the instruction signal acquired from sensor expansion determination unit 5.

As described above, when existing monitoring sensor 31 is connected to the first sensor connection position, display apparatus 33 displays that failure diagnosis of the sensor connection position is started.

When existing monitoring sensor 31 is not connected to the first sensor connection position and monitoring sensor 31 cannot be reconnected to the first sensor connection position, display apparatus 33 displays the position information of the first sensor connection position to which a diagnosis sensor is to be additionally connected. In this case, display apparatus 33 displays a display for prompting additional connection of a new diagnosis sensor to the first sensor connection position. Further, display apparatus 33 displays a work procedure for additionally connecting a new diagnosis sensor to the first sensor connection position.

When existing monitoring sensor 31 is not connected to the first sensor connection position and monitoring sensor 31 can be reconnected to the first sensor connection position, display apparatus 33 displays the position information of the first sensor connection position to which monitoring sensor 31 is to be reconnected. Further, in this case, display apparatus 33 displays a display for prompting reconnection of monitoring sensor 31 to the first sensor connection position. Furthermore, display apparatus 33 displays a work procedure for reconnecting the monitoring sensor to the first sensor connection position.

As the position information of the first sensor connection position, a corresponding page of a manual or an instruction manual or the like describing the first sensor connection position may be displayed on display apparatus 33. Further, as the position information of the first sensor connection position, an image indicating sensor connection positions P1 to P8 as illustrated in FIG. 4 may be displayed on display apparatus 33. The user or the service person can confirm the position information of the first sensor connection position on display apparatus 33. As a result, the user or the service person can easily know the position to which the diagnosis sensor should be connected.

Further, the failure diagnosis system of the present embodiment includes the diagnosis support system, a diagnosis sensor 34, and an operating characteristic analysis unit 8 of controller 10. Diagnosis sensor 34 may be a sensor existing at the first sensor connection position, may be monitoring sensor 31 reconnected to the first sensor connection position, or may be a sensor newly and additionally connected to the first sensor connection position. Diagnosis sensor 34 detects an operating characteristic of work machine 100 when work machine 100 is operated for diagnosis. Diagnosis sensor 34 outputs the detected operating characteristic as a detection signal to operating characteristic analysis unit 8 of controller 10. Operating characteristic analysis unit 8 automatically analyzes the operating characteristic of work machine 100 based on the detection signal from diagnosis sensor 34. Operating characteristic analysis unit 8 outputs a signal indicating the analysis result to display apparatus control unit 6. Display apparatus control unit 6 controls display apparatus 33 to display the analysis result based on the acquired signal of the analysis result. As a result, display apparatus 33 displays the analysis result.

<Diagnosis Support Method>

Next, a diagnosis support method by the diagnosis support system will be described.

Figure 7:
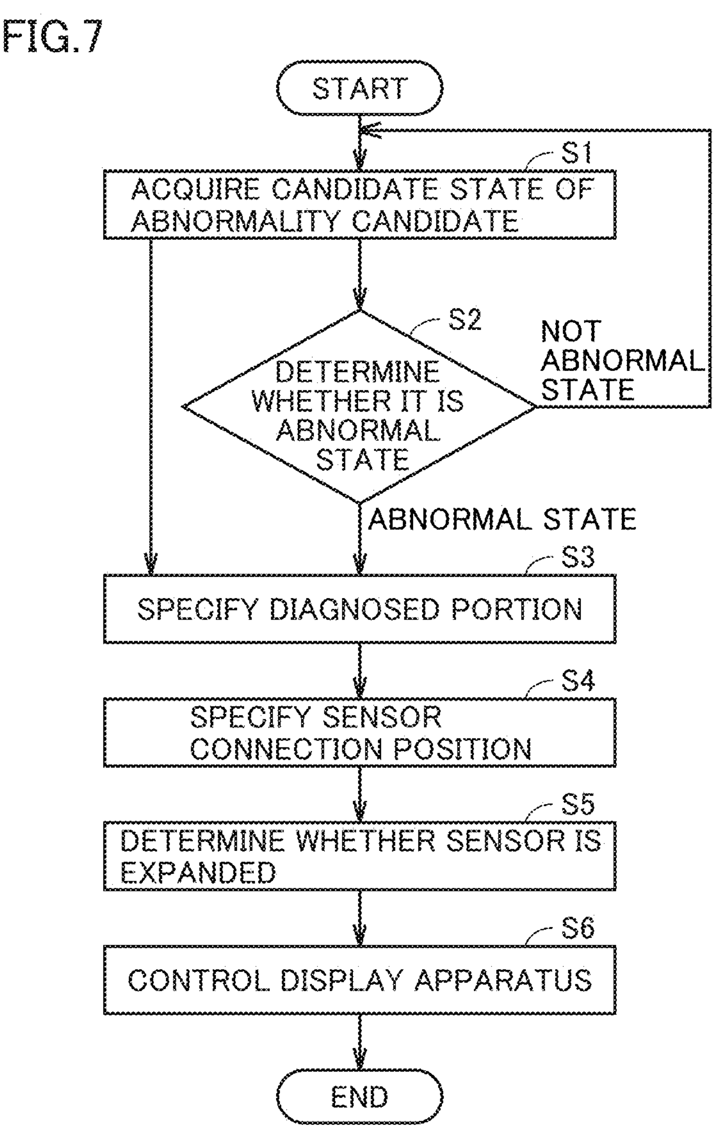
FIG. 7 is a flowchart showing an example of a diagnosis support method for the work machine according to the embodiment of the present disclosure.
Figure 8:
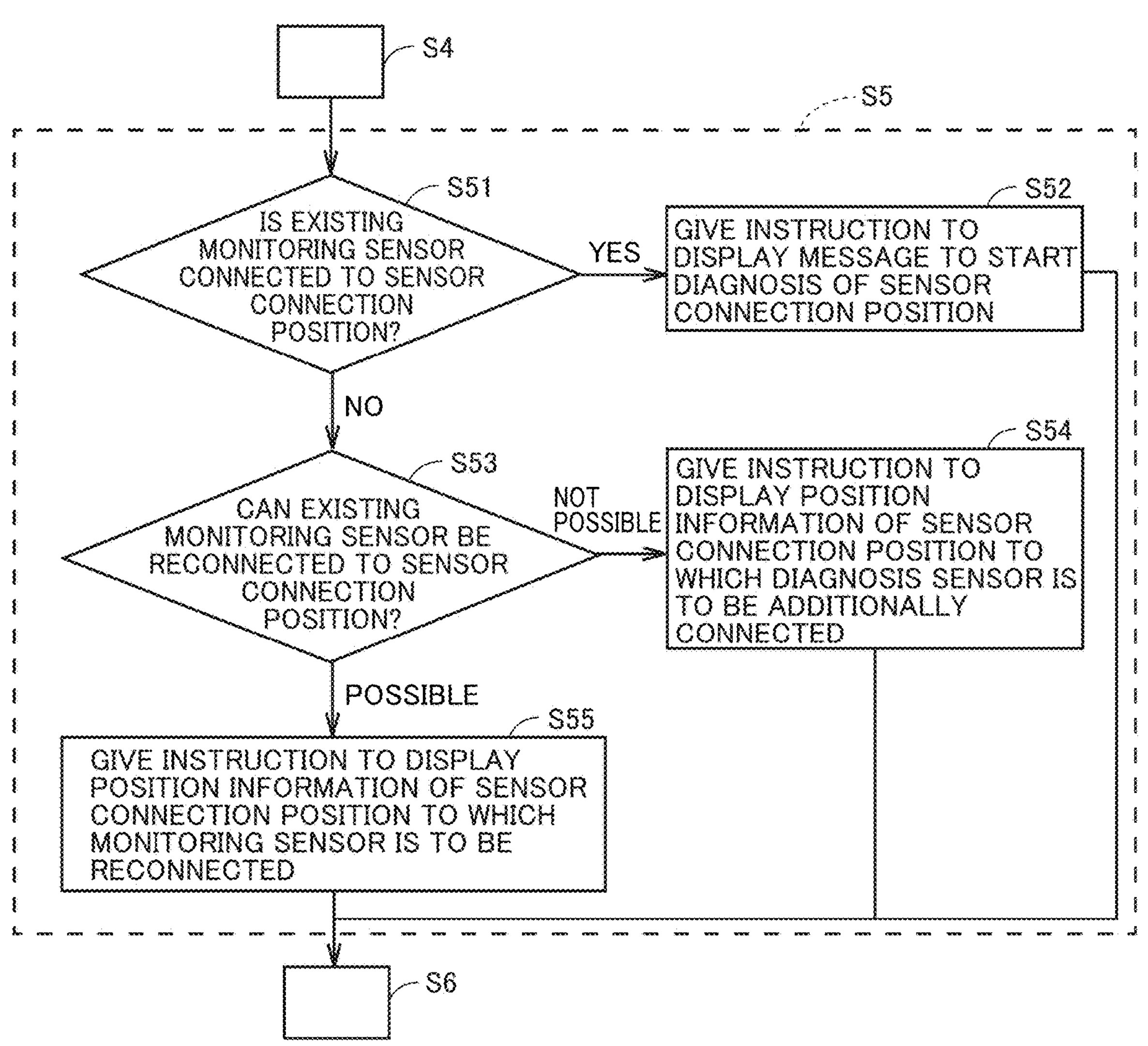
FIG. 8 is a flowchart showing a processing step of sensor expansion determination in FIG. 7.

FIG. 7 is a flowchart showing an example of the diagnosis support method for the work machine according to the embodiment of the present disclosure. FIG. 8 is a flowchart showing a processing step of sensor expansion determination in FIG. 7.

As illustrated in FIGS. 6 and 7, candidate information acquisition unit 1 of controller 10 acquires a detection signal of monitoring sensor 31 or an input signal of input device 32 as a candidate state of an abnormality candidate (step S1: FIG. 7).

The detection signal of monitoring sensor 31 may be, for example, a detection signal of monitoring sensor 31 that monitors an operating characteristic of the power transmission device. Monitoring sensor 31 may be a sensor attached to any one of sensor connection positions P1 to P9 in FIG. 3.

The input signal of input device 32 is a signal input to input device 32 by the user who has sensed shock (shift shock), for example, when the user has sensed the shift shock at the time of the shift operation. For example, in a case where the user performs input operation on input device 32 at the timing when the shift shock is sensed, the input signal of input device 32 is a signal indicating the timing when the input operation is executed. In addition, in a case where the user inputs the time when the shift shock is sensed to input device 32, the input signal of input device 32 is a signal indicating the input time. In addition, in a case where the user who has sensed the shift shock inputs a portion where the user thinks that an abnormality has occurred to input device 32, the input signal of input device 32 is a signal indicating the portion.

When the detection signal of monitoring sensor 31 is acquired, candidate information acquisition unit 1 outputs the acquired detection signal of monitoring sensor 31 to abnormal state determination unit 2 as candidate information. Further, when the input signal of input device 32 is acquired, candidate information acquisition unit 1 outputs the acquired input signal of input device 32 to diagnosed portion specification unit 3.

Based on the acquired candidate information, abnormal state determination unit 2 determines whether or not the operating characteristic detected by monitoring sensor 31 is in the abnormal state (step S2: FIG. 7). When abnormal state determination unit 2 determines that the operating characteristic is not in an abnormal state, the acquisition of a detection signal of monitoring sensor 31 (step S1) and the determination of the abnormal state (step S2) are repeated. When abnormal state determination unit 2 determines that the operating characteristic is in the abnormal state, abnormal state determination unit 2 outputs a signal indicating the determination result to diagnosed portion specification unit 3.

When it has been determined that the operating characteristic is in the abnormal state, abnormal state determination unit 2 outputs a signal indicating the determination result to display apparatus control unit 6. Display apparatus control unit 6 controls display apparatus 33 to display that an abnormality has occurred on the basis of the acquired signal of the determination result. As a result, display apparatus 33 displays that an abnormality has occurred. As a result, for example, the user who has sensed the shift shock confirms contents displayed on display apparatus 33 and recognizes a possibility that an abnormality has occurred in the power transmission device (for example, clutch mechanisms 41A to 41C, 42A to 42D).

Based on the signal of the determination result acquired from abnormal state determination unit 2 or the input signal of input device 32 acquired from candidate information acquisition unit 1, diagnosed portion specification unit 3 specifies a portion (diagnosed portion) required to be diagnosed (step S3: FIG. 7).

Diagnosed portion specification unit 3 specifies the diagnosed portion of work machine 100 based on the detection signal of monitoring sensor 31 determined to be abnormal. At this time, diagnosed portion specification unit 3 specifies the diagnosed portion with reference to the first table stored in storage unit 7.

In addition, diagnosed portion specification unit 3 specifies the diagnosed portion of work machine 100 based on the timing information as the abnormality occurrence timing or the portion information related to the portion at which the abnormality is sensed. At this time, when the user operates input device 32, the operating characteristic value of each unit of work machine 100 at the timing when input device 32 is operated is stored in storage unit 7. Diagnosed portion specification unit 3 identifies the diagnosed portion based on a comparison between the operating characteristic value of each unit at the timing when input device 32 is operated, the operating characteristic value being stored in storage unit 7, and the normal operating characteristic value of each unit stored in storage unit 7. At this time, the diagnosed portion is specified based on the operating characteristic value deviating from the normal operating characteristic value of each unit among the operating characteristic values of each unit at the timing when input device 32 is operated.

When the user inputs the time when the abnormality is sensed to input device 32, diagnosed portion specification unit 3 specifies the diagnosed portion based on the comparison between the operating characteristic value of each unit at the input time from among the operating characteristic values continuously stored in storage unit 7 and the normal operating characteristic value of each unit stored in storage unit 7. At this time, the diagnosed portion is specified based on the operating characteristic value deviated from the normal operating characteristic value of each unit among the operating characteristic values of each unit at the input time.

When the user inputs a portion where an abnormality is sensed, diagnosed portion specification unit 3 refers to the second table stored in storage unit 7 to identify a diagnosed location.

Diagnosed portion specification unit 3 outputs a signal indicating the specified diagnosed portion to sensor connection position specification unit 4.

Sensor connection position specification unit 4 specifies a sensor connection position for connecting the diagnosis sensor (first sensor connection position) based on the acquired signal of the diagnosed portion (step S4: FIG. 7). Sensor connection position specification unit 4 may specify one first sensor connection position or may specify a plurality of first sensor connection positions. For example, sensor connection position specification unit 4 may specify the plurality of sensor connection positions P1 to P9 illustrated in FIG. 3 as the first sensor connection positions.

Sensor connection position specification unit 4 refers to the third table stored in storage unit 7, and specifies the first sensor connection position based on the acquired signal of the diagnosed portion. Sensor connection position specification unit 4 outputs a signal indicating the specified first sensor connection position to sensor expansion determination unit 5.

Sensor expansion determination unit 5 determines whether or not the sensor is expanded based on the acquired signal indicating the first sensor connection position (step S5: FIG. 7). A flow of the determination by sensor expansion determination unit 5 will be described with reference to FIGS. 6 and 8.

As illustrated in FIGS. 6 and 8, sensor expansion determination unit 5 determines whether or not an existing monitoring sensor is connected to the first sensor connection position (step S51: FIG. 8). Sensor expansion determination unit 5 refers to the connection position information stored in storage unit 7, and determines whether or not the monitoring sensor is connected to the first sensor connection position on the basis of the acquired first sensor connection position.

When it is determined that that the existing monitoring sensor is connected to the first sensor connection position, sensor expansion determination unit 5 instructs display apparatus control unit 6 to display a message to start diagnosis of the first sensor connection position (step S52: FIG. 8).

On the other hand, when it is determined that no existing monitoring sensor is connected to the first sensor connection position, sensor expansion determination unit 5 determines whether or not the existing monitoring sensor can be reconnected to the first sensor connection position (step S53: FIG. 8). Sensor expansion determination unit 5 refers to the sensor type information stored in storage unit 7 and determines whether the existing monitoring sensor can be reconnected to the first sensor connection position based on the acquired first sensor connection position.

At this time, sensor expansion determination unit 5 determines whether or not the type of the first wiring cable at the first sensor connection position matches the type of the second wiring cable at the second sensor connection position, and when it is determined that the types match, sensor expansion determination unit 5 determines that the existing monitoring sensor can be reconnected to the first sensor connection position. Sensor expansion determination unit 5 may determine whether or not the type of the sensor connectable to the first sensor connection position is the same as the type of the existing monitoring sensor, and may determine that the existing monitoring sensor can be used for diagnosis by reconnecting the existing monitoring sensor to the first sensor connection position when it is determined that the types of the sensors are the same. When it is determined that the second wiring cable itself fails based on the data at the time of connection, sensor expansion determination unit 5 may determine that the existing monitoring sensor cannot be reconnected to the first sensor connection position.

When it is determined that the existing monitoring sensor cannot be reconnected to the first sensor connection position, sensor expansion determination unit 5 instructs display apparatus control unit 6 to display the position information of the first sensor connection position to which the diagnosis sensor is to be additionally connected (step S54: FIG. 8). In this case, sensor expansion determination unit 5 instructs display apparatus control unit 6 to display information on a work procedure for additionally connecting a diagnosis sensor to the first sensor connection position.

On the other hand, when it is determined that the existing monitoring sensor can be reconnected to the first sensor connection position, sensor expansion determination unit 5 instructs display apparatus control unit 6 to display the position information of the first sensor connection position to which the monitoring sensor is to be reconnected (step S55: FIG. 8). In this case, sensor expansion determination unit 5 instructs display apparatus control unit 6 to display information on a work procedure for reconnecting the monitoring sensor from the second sensor connection position to the first sensor connection position.

As described above, sensor expansion determination unit 5 determines whether or not the sensor is expanded, and outputs an instruction signal to display apparatus control unit 6 based on the determination result.

As illustrated in FIGS. 6 and 7, display apparatus control unit 6 controls display apparatus 33 based on the instruction signal acquired from sensor expansion determination unit 5 (step S6: FIG. 7).

As described above, when existing monitoring sensor 31 is connected to the first sensor connection position, display apparatus 33 displays that diagnosis of the sensor connection position is started.

When existing monitoring sensor 31 is not connected to the first sensor connection position and monitoring sensor 31 cannot be reconnected to the first sensor connection position, display apparatus 33 displays the position information of the first sensor connection position to which a diagnosis sensor is to be additionally connected. In this case, display apparatus 33 displays a display for prompting additional connection of a new diagnosis sensor to the first sensor connection position. Furthermore, display apparatus 33 displays a work procedure for additionally connecting a new diagnosis sensor to the first sensor connection position.

When existing monitoring sensor 31 is not connected to the first sensor connection position and monitoring sensor 31 can be reconnected to the first sensor connection position, display apparatus 33 displays the position information of the first sensor connection position to which monitoring sensor 31 is to be reconnected. Furthermore, in this case, display apparatus 33 displays a display for prompting reconnection of monitoring sensor 31 from the second sensor connection position to the first sensor connection position. Further, display apparatus 33 displays a work procedure for reconnecting the monitoring sensor to the first sensor connection position.

As the position information of the first sensor connection position, a corresponding page of a manual or an instruction manual or the like describing the first sensor connection position may be displayed on display apparatus 33. Further, as the position information of the first sensor connection position, an image indicating sensor connection positions P1 to P8 as illustrated in FIG. 4 may be displayed on display apparatus 33.

Moreover, as information of a work procedure in connection of the diagnosis sensor (additional connection of a new diagnosis sensor or reconnection of a monitoring sensor), a corresponding page of a manual or an instruction manual or the like describing the work procedure may be displayed on display apparatus 33. In addition, as information of a work procedure in connection of the diagnosis sensor, an image may be displayed on display apparatus 33.

The user or the service person can confirm the position information of the first sensor connection position and the work procedure on display apparatus 33. As a result, the user or the service person can easily learn the position where the diagnosis sensor is to be connected and the work procedure for connecting the diagnosis sensor.

A user or a service person reconnects the existing monitoring sensor as a diagnosis sensor or connects a new diagnosis sensor to the first sensor connection position necessary for diagnosis based on the position information of the first sensor connection position displayed on display apparatus 33. As a result, it is possible to diagnose the first sensor connection position at which diagnosis is necessary.

<Failure Diagnosis Process after Connecting Diagnosis Sensor>

Next, a process of failure diagnosis after connecting the diagnosis sensor will be described with reference to FIG. 9.

FIG. 9 is a flowchart showing a processing step of failure diagnosis after connecting the diagnosis sensor. As illustrated in FIG. 9, diagnosis sensor 34 (FIG. 6) is connected to the first sensor connection position necessary for diagnosis by the user or the service person (step S11).

As illustrated in FIG. 3, when diagnosis sensor 34 is connected to the first sensor connection position (for example, one of P1 to P9), a signal indicating that diagnosis sensor 34 is connected to the first sensor connection position is output to controller 10. When monitoring sensor 31 (FIG. 6) is reconnected from the second sensor connection position to the first sensor connection position, controller 10 recognizes monitoring sensor 31 as diagnosis sensor 34 connected to the first sensor connection position based on a signal indicating that the reconnection of monitoring sensor 31 is completed. Further, when new diagnosis sensor 34 is connected to the first sensor connection position, controller 10 recognizes new diagnosis sensor 34 as diagnosis sensor 34 connected to the first sensor connection position based on a signal indicating that new diagnosis sensor 34 is connected to the first sensor connection position.

In a case where existing monitoring sensor 31 is reconnected as diagnosis sensor 34 or in a case where new diagnosis sensor 34 is connected, a diagnosis mode is entered, and pre-operation check is automatically performed (step S12). The pre-operation check is to check, in a state where work machine 100 is stopped, whether or not diagnosis sensor 34 is correctly attached to the sensor connection position and whether or not diagnosis sensor 34 can correctly detect the operating characteristic.

As a result of the pre-operation check, when the command and the operating characteristic (for example, hydraulic pressure) are significantly different, the user or the service person confirms the connection of or performs replacement of diagnosis sensor 34, or instructs controller 10 using input device 32. Further, if there is no abnormality in diagnosis sensor 34 as a result of the pre-operation check, controller 10 controls display apparatus 33 to display operation permission.

After confirming the display of the operation permission, the user operates work machine 100 to reproduce an operation that has sensed or detected the abnormality (step S13). In a case where the user senses a shock at the time of a shift operation, for example, the same operation as the shift operation in which the shock is sensed is reproduced.

In this operation, controller 10 automatically analyzes the operating characteristic of work machine 100 based on the detection signal from diagnosis sensor 34 (step S14). For example, controller 10 acquires, from the diagnosis sensor, a signal of a change in the rotational speed or a change in the hydraulic pressure, which causes shock in the shifting operation, and performs automatic analysis. Specifically, operating characteristic analysis unit 8 (FIG. 6) of controller 10 performs the automatic analysis. Controller 10 displays a result of the automatic analysis on display apparatus 33 or transmits the result to user terminal 68 or service terminal 69 through communication network 62. As a result, when an exceptional event occurs due to the automatic analysis, the exceptional event can be analyzed by a quality maintenance department, a design department, or the like through service terminal 69.

As a result of the automatic analysis, the cause of the abnormality is determined and the diagnosis is completed (step S15). As a result of the automatic analysis, when controller 10 determines that the cause of the abnormality is the hydraulic valve, for example, controller 10 displays the determination result that the hydraulic valve needs to be replaced on display apparatus 33 or transmits the determination result to user terminal 68 or service terminal 69 through communication network 62.

Thereafter, controller 10 recommends a next action (step S16). As the next action, controller 10 displays, on display apparatus 33, information on whether to continuously operate work machine 100 or to stop the operation until repair, for example, or transmits the information to user terminal 68 or service terminal 69 through communication network 62. The next action may be an automatic analysis or an instruction of a replacement consumable part.

When work machine 100 is restarted, the monitoring sensor used as the diagnosis sensor is reconnected to the original sensor connection position (step S17). The monitoring sensor is reconnected by, for example, the user or the service person.

As described above, the operation of the failure diagnosis after connecting the diagnosis sensor in the present embodiment ends (step S18).

<Effects>

Next, effects of the present embodiment will be described.

As illustrated in FIGS. 3 and 4, for example, in the case of the power transmission device including a transmission or the like, there are a large number of sensor connection positions P1 to P9 at which a hydraulic pressure as an operating characteristic is desired to be measured. Therefore, installing diagnosis sensors to all sensor connection positions P1 to P9 where the hydraulic pressure is desired to be measured for failure diagnosis leads to an increase in the number of components. In particular, in the case of a small and medium mass production model, it is difficult to install a large number of diagnosis sensors and provide each of these sensors with a communication function, in terms of cost.

In the present embodiment, as illustrated in FIG. 6, controller 10 controls display apparatus 33 to display the position information of the first sensor connection position (for example, P1 to P9) to which the diagnosis sensor is to be connected. On display apparatus 33, for example, a corresponding page of a manual or an instruction manual or the like describing the first sensor connection positions P1 to P9, or an image indicating the first sensor connection positions P1 to P8 as illustrated in FIG. 4 may be displayed. The user or the service person can easily learn the position to which the diagnosis sensor should be connected by confirming the position information of the first sensor connection positions P1 to P9 on display apparatus 33. This reduces labor of connection of the diagnosis sensor at the time of failure diagnosis. Therefore, it is not necessary to install diagnosis sensors to all first sensor connection positions P1 to P9 where the operating characteristic is desired to be measured, and the diagnosis sensor may be connected to a position necessary only at the time of failure diagnosis. Therefore, an easy and accurate failure diagnosis can be performed with a small number of components.

In the present embodiment, as illustrated in FIG. 6, controller 10 controls display apparatus 33 to display information on a work procedure for connecting the diagnosis sensor to the first sensor connection positions P1 to P9. As a result, the user or the service person can easily and accurately perform the failure diagnosis by confirming the work procedure on display apparatus 33.

In the present embodiment, as illustrated in FIG. 6, controller 10 determines whether or not the first sensor connection position is different from the second sensor connection position. Accordingly, it is possible to learn whether or not it is necessary to reconnect the monitoring sensor connected to the second sensor connection position to the first sensor connection position as the diagnosis sensor.

Further, in the present embodiment, as illustrated in FIG. 6, when it is determined that the first sensor connection position is different from the second sensor connection position, controller 10 determines whether or not reconnection of the monitoring sensor from the second sensor connection position to the first sensor connection position is possible. As a result, it is possible to learn whether or not a new sensor other than the monitoring sensor is additionally required as the diagnosis sensor to be connected to the first sensor connection position.

In addition, in the present embodiment, as illustrated in FIG. 6, in a case where it is determined that reconnection of the monitoring sensor from the second sensor connection position to the first sensor connection position is possible, controller 10 controls display apparatus 33 to give an instruction on reconnection of the monitoring sensor from the second sensor connection position to the first sensor connection position. As a result, the user or the service person can learn that reconnection of the monitoring sensor from the second sensor connection position to the first sensor connection position is necessary. In addition, since the monitoring sensor can be used as the diagnosis sensor, it is not necessary to additionally prepare a diagnosis sensor. This makes it possible to perform failure diagnosis with a small number of sensors.

It is assumed as an example that a monitoring sensor is connected to sensor connection positions P9 (second sensor connection position) and no monitoring sensor is connected to the other sensor connection positions P1 to P8 in FIG. 3. In this case, it is possible to diagnose whether or not there is a failure in forward low-speed clutch mechanism 41A by performing failure diagnosis by reconnecting the monitoring sensor connected to sensor connection position P9 to sensor connection position P1, for example. In this manner, by performing failure diagnosis by sequentially reconnecting the monitoring sensor connected to sensor connection positions P9 from sensor connection positions P1 to sensor connection positions P8 to b, it is possible to diagnose whether or not there is a failure in each of clutch mechanisms 41A to 41C, 42A to 42D, and 55. In addition, it is possible to diagnose whether or not there is a failure in hydraulic pump 51, oil filter 56, and the like by performing failure diagnosis while the monitoring sensor is connected to sensor connection positions P9.

In the present embodiment, as illustrated in FIG. 9, controller 10 recognizes that the monitoring sensor is the diagnosis sensor connected to the first sensor connection position based on a signal indicating that reconnection of the monitoring sensor from the second sensor connection position to the first sensor connection position is completed. This makes it possible to perform failure diagnosis using the monitoring sensor as the diagnosis sensor.

Here, in the above embodiment, controller 10 illustrated in each of FIGS. 3 and 6 may be mounted on motor grader 100 or may be disposed away from motor grader 100. When controller 10 is disposed away from motor grader 100, controller 10 may be management server 65 (communication server 66, maintenance server 67) illustrated in FIG. 5. When controller 10 is disposed away from motor grader 100, controller 10 may be wirelessly connected to monitoring sensor 31, input device 32, display apparatus 33, and the like. Controller 10 is a processor, for example, and may be a central processing unit (CPU). Storage unit 7 may be a memory, for example.

In the above embodiment, the case where input device 32 and display apparatus 33 are disposed in operator's cab 11 as illustrated in FIG. 1 has been described, but these components may be disposed outside operator's cab 11. Further, display apparatus 33 may be disposed away from motor grader 100. In this case, display apparatus 33 may be user terminal 68, service terminal 69, or the like, or may be a tablet terminal or the like. When display apparatus 33 is a tablet terminal, display apparatus 33 may also serve as input device 32.

Furthermore, motor grader 100 may be remotely operated. In this case, display apparatus 33, the operation apparatus, and the like are disposed at a distant place from motor grader 100. Motor grader 100 is operated by wirelessly receiving an operation command output from display apparatus 33, the operation apparatus, or the like disposed at the distant place.

In the present specification, an abnormality is a state in which the operator senses or the sensor detects that an operating characteristic of the work machine is not normal. By performing diagnosis based on the information of the abnormality, diagnosis as to whether there is a failure is performed. The operating characteristic may be a pressure other than the hydraulic pressure, or may be a characteristic such as a temperature and a speed (for example, rotational speed) other than the pressure.

The embodiment disclosed herein should be considered to be illustrative in all respects and not restrictive. The scope of the present invention is defined by the claims, instead of the descriptions stated above, and it is intended that meanings equivalent to the claims and all modifications within the scope are included.

REFERENCE SIGNS LIST

1: candidate information acquisition unit, 2: abnormal state determination unit, 3: diagnosed portion specification unit, 4: sensor connection position specification unit, 5: sensor expansion determination unit, 6: display apparatus control unit, 7: storage unit, 8: operating characteristic analysis unit, 10: controller, 11: operator's cab, 11S: operator's seat, 12: work implement, 13: engine cover, 13*a*: transmission, 13*b*: torque converter, 13*c*: engine, 14: front frame, 15: rear frame, 16: front wheel, 17: rear wheel, 18: vehicle body frame, 21: blade, 22: drawbar, 23: swing circle, 25: lift cylinder, 28: articulated cylinder, 31: monitoring sensor, 32: input device, 33: display apparatus, 34: diagnosis sensor, 41, 41A to 41C: direction switching clutch mechanism, 42, 42A to 42D: speed switching clutch mechanism, 45: connection force control mechanism, 45A to 45G: electronic control regulating valve, 51: hydraulic pump, 52*a*, 52*b*: conduit, 53: lock-up valve, 54: lock-up solenoid valve, 55: lock-up clutch mechanism, 56: oil filter, 61: satellite earth station, 62: communication network, 63: communication satellite, 64: GPS satellite, 65: management server, 66: communication server, 67: maintenance server, 68: user terminal, 69: service terminal, 100: work machine (motor grader), 121: axis line, P1 to P9: sensor connection position

The invention claimed is:

1. A diagnosis support system for a work machine, the diagnosis support system comprising:

a display apparatus; and a controller having a memory that stores a table indicating a correspondence relationship between diagnosed portions and a plurality of sensor connection positions, wherein the controller specifies a diagnosed portion in the work machine based on candidate information of an abnormality candidate in the work machine, refers to the table, specifies, from among the plurality of sensor connection positions, a first sensor connection position of a diagnosis sensor for diagnosis of the diagnosed portion based on the diagnosed portion, and controls the display apparatus to display position information of the first sensor connection position, and the abnormality candidate being a potential cause for an abnormality detected in an operating characteristic of the work machine.

2. The diagnosis support system for a work machine according to claim 1, wherein the controller controls the display apparatus to display information on a work procedure for connecting the diagnosis sensor to the first sensor connection position.

3. The diagnosis support system for a work machine according to claim 1, further comprising:

a monitoring sensor connected to a second sensor connection position of the work machine, wherein the controller determines whether or not the first sensor connection position is different from the second sensor connection position.

4. The diagnosis support system for a work machine according to claim 3, wherein when the controller has determined that the first sensor connection position is different from the second sensor connection position, the controller determines whether or not reconnection of the monitoring sensor from the second sensor connection position to the first sensor connection position is possible.

5. The diagnosis support system for a work machine according to claim 4, wherein when the controller has determined that reconnection of the monitoring sensor from the second sensor connection position to the first sensor connection position is possible, the controller controls the display apparatus to give an instruction on reconnection of the monitoring sensor from the second sensor connection position to the first sensor connection position.

6. The diagnosis support system for a work machine according to claim 5, wherein the controller recognizes the monitoring sensor as the diagnosis sensor connected to the first sensor connection position, based on a signal indicating that reconnection of the monitoring sensor from the second sensor connection position to the first sensor connection position is completed.

7. A system for a work machine, the system comprising:

the diagnosis support system for a work machine according to claim 1; and the diagnosis sensor connected to the first sensor connection position, wherein the controller analyzes the operating characteristic of the work machine based on a detection signal from the diagnosis sensor.

8. A diagnosis support method for a work machine having a display apparatus, the diagnosis support method comprising:

specifying a diagnosed portion in the work machine based on candidate information of an abnormality candidate in the work machine;

referring to a table, stored in a memory, that indicates a correspondence relationship between diagnosed portions and a plurality of sensor connection positions;

specifying, from among the plurality of sensor connection positions, a first sensor connection position of a diagnosis sensor for diagnosis of the diagnosed portion based on the diagnosed portion; and controlling the display apparatus to display position information of the first sensor connection position, wherein the abnormality candidate being a potential cause for an abnormality detected in an operating characteristic of the work machine.

9. A failure diagnosis method for a work machine, the failure diagnosis method comprising:

analyzing, after the diagnosis support method for a work machine according to claim 8, the operating characteristic of the work machine based on a detection signal from the diagnosis sensor connected to the first sensor connection position.

* * * * *